(12) United States Patent
Gorin et al.

(10) Patent No.: US 7,399,920 B2
(45) Date of Patent: *Jul. 15, 2008

(54) WALL PLATE WITH INTERNAL NOSE FOR LOW VOLTAGE COMMUNICATIONS CABLE AND HIGH VOLTAGE PLUG RECEPTACLE

(75) Inventors: Thomas Michael Gorin, Atlanta, GA (US); James Loye Hutchinson, Dallas, GA (US)

(73) Assignee: Data:)Comm Electronics, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/733,527

(22) Filed: Apr. 10, 2007

(65) Prior Publication Data
US 2007/0197061 A1 Aug. 23, 2007

Related U.S. Application Data

(63) Continuation-in-part of application No. 11/355,553, filed on Feb. 16, 2006.

(51) Int. Cl.
H02G 3/14 (2006.01)
(52) U.S. Cl. .............................. 174/66; 174/67; 174/53; 220/241
(58) Field of Classification Search .................... 174/66, 174/67; 222/241, 242; 439/101
See application file for complete search history.

(56) References Cited

U.S. PATENT DOCUMENTS

| D126,098 | S |   | 3/1941  | McIntosh |
| D131,009 | S |   | 1/1942  | Leslie |
| D131,010 | S |   | 1/1942  | Leslie |
| D134,477 | S |   | 12/1942 | Leslie |
| 2,427,349 | A |   | 9/1947  | Boynton ..................... 173/330 |
| 4,289,921 | A | * | 9/1981  | Gartner et al. .............. 174/488 |
| D261,924 | S |   | 11/1981 | Donohue ................... D23/127 |
| 4,504,698 | A | * | 3/1985  | Greenwood .................. 174/66 |
| D286,739 | S | * | 11/1986 | Larsson ....................... D8/353 |
| 4,688,747 | A |   | 8/1987  | Helmsdorfer et al. ......... 248/56 |
| D301,333 | S |   | 5/1989  | Bongard et al. ............. D13/13 |
| D301,336 | S |   | 5/1989  | Copeland .................... D13/32 |
| D301,872 | S |   | 6/1989  | Copeland .................... D13/32 |
| D321,557 | S |   | 11/1991 | Bezick et al. .............. D23/393 |
| 5,114,365 | A | * | 5/1992  | Thompson et al. ........ 439/540.1 |
| 5,218,169 | A | * | 6/1993  | Riceman ...................... 174/67 |
| 5,243,135 | A | * | 9/1993  | Shotey ........................ 174/67 |
| 5,257,946 | A | * | 11/1993 | MacMillan et al. ......... 439/535 |
| D346,587 | S |   | 5/1994  | Herman et al. ............. D13/177 |
| D350,278 | S | * | 9/1994  | Figueroa ..................... D8/353 |

(Continued)

*Primary Examiner*—Dhiru R Patel
(74) *Attorney, Agent, or Firm*—Thomas, Kayden, Hostemeyer & Risley, LLP

(57) ABSTRACT

A dual purpose wall plate (10) includes a flat support plate (20) that defines on one half a support plate opening (26) and a sloped cable support extension (32) for extending into the hollow wall structure and for passing low voltage communications cable (39) through the wall. The other half of the support plate (20) includes a plug opening (38) and a plug receptacle housing (40) and a high voltage plug receptacle (44) for receiving a power plug (41). The external surface of the dual purpose wall plate is substantially flat and substantially coextensive with the wall to which it is mounted, therefore forming no protrusions that would interfere with the mounting of a flat screen television or other device directly over the wall plate.

18 Claims, 3 Drawing Sheets

U.S. PATENT DOCUMENTS

| | | | |
|---|---|---|---|
| 5,419,716 A * | 5/1995 | Sciammarella et al. | 439/540.1 |
| D369,953 S * | 5/1996 | Carr | D8/353 |
| D370,890 S | 6/1996 | Tiberio, Jr. | D13/146 |
| D379,797 S | 6/1997 | Arnett | D13/156 |
| 5,645,449 A * | 7/1997 | Sabo | 439/540.1 |
| 5,664,955 A | 9/1997 | Arnett | 439/135 |
| D399,829 S | 10/1998 | Reed | D13/156 |
| D401,561 S | 11/1998 | Brownell et al. | D13/156 |
| D408,018 S | 4/1999 | McNaughton | D13/177 |
| D411,734 S * | 6/1999 | Hsiang | D8/353 |
| D430,149 S | 8/2000 | Afshar-Ghochani | D14/240 |
| D449,584 S | 10/2001 | Dinh | D13/156 |
| 6,297,450 B1 * | 10/2001 | Yu | 174/66 |
| D450,663 S | 11/2001 | Smith | D13/177 |
| 6,520,363 B1 * | 2/2003 | Sullivan | 220/3.8 |
| D495,041 S | 8/2004 | Thomas | D23/325 |
| D495,301 S * | 8/2004 | Newell | D13/152 |
| D502,386 S | 3/2005 | Provenzano et al. | D8/350 |
| D503,156 S | 3/2005 | Provenzano | D13/156 |
| 6,932,624 B1 * | 8/2005 | Hoopes et al. | 439/76.1 |
| 7,022,915 B1 * | 4/2006 | Galguera | 174/66 |
| 7,067,737 B2 * | 6/2006 | Mallen | 174/66 |
| D544,475 S * | 6/2007 | Udagawa et al. | D14/248 |
| 7,247,793 B2 * | 7/2007 | Hinkson et al. | 174/66 |
| 7,271,339 B2 * | 9/2007 | Dinh | 174/66 |

* cited by examiner

WALL PLATE WITH INTERNAL NOSE FOR LOW VOLTAGE COMMUNICATIONS CABLE AND HIGH VOLTAGE PLUG RECEPTACLE

CROSS REFERENCE

This is a continuation-in-part of co-pending application Ser. No. 11/355,553 filed in the U.S. Patent Office on Feb. 16, 2006, which is adopted herein in its entirety.

FIELD OF THE INVENTION

This invention concerns a wall plate that mounts about a hole in a wall structure for passing electrical wiring from the wall into a room. The wall plate has an opening therein for the passage of a low voltage communication cable of the type that is to connect to a home theater, a stereo system and other communication devices. The wall plate also includes a high voltage plug receptacle for powering the communication device.

BACKGROUND OF THE INVENTION

When communications devices such as stereo systems, televisions, computers, home theaters, etc. are to be placed in a room of a building structure, it is desirable to have the communication cable(s) leading to the equipment pass interiorly through the hollow wall structure to a position adjacent the equipment and then through an opening in the wall board to the equipment. A wall plate having a cable access opening may be mounted in the wall opening for extending the cable into the room and forming a neater look about the wall opening. This also provides a neater look in the room by avoiding the lengths of cable from being exposed in the room.

In the past, wall plates usually were simply flat plastic plates mountable to the wall over the holes in the walls, and the wall plates had access holes passing the cable(s) into the room. This formed a more "finished look" to the cable entry. However, when the hole in the wall plate was not occupied by a cable, or when the cable occupied less than all the space of the access hole, a person could see through the access hole in the wall plate and possibly see into the wall structure.

Later, wall plates were developed that have a cable support extension or "nose shield" that protrudes from the wall plate into the room, with the nose shield having a vertically facing opening that communicates with the horizontally facing access hole in the wall plate. The cable was extended from the access opening and through the nose shield and into the room for connection to the sound system, etc. This type of wall plate having a nose-shield has met with popular use since the nose-shield provides a visual barrier through the opening in the wall plate.

More recently, some electrical appliances, particularly flat screen televisions, are mounted directly to the wall, so that the protruding nose of a wall plate interferes with mounting the television in flat abutment with the surface of the wall. The wall plate can be displaced laterally or vertically with respect to the flat screen television with the opening of the nose of the wall plate directed toward the television so as to provide the least exposure of the cable. However, this arrangement does not hide the wall plate or the short run of the cable leading to the television set, and usually is considered visually obnoxious.

In addition to the running of communications cable to the communications equipment, a high voltage line that runs from the TV set or other communications equipment to a plug receptacle may be required. This is likely to present a similar visual problem for the home owner. The high voltage power plug receptacle might be displaced from the position of the equipment and the power line is similarly visually exposed.

It is to the above-described matters that this invention is directed.

SUMMARY OF THE INVENTION

Briefly described, this invention concerns a dual purpose wall plate for mounting about an opening in a wall structure for operating a communications device such as a flat screen television set, a sound system or other device. The wall plate has an access opening that passes a low voltage communications cable from inside a hollow wall through the wall board to a communications device. Also, the wall plate includes a high voltage plug receptacle for receiving the plug of the electrical supply cord from the communications device.

The wall plate includes a flat support plate having an inner surface for mounting against the wall about the wall opening. An access opening is formed in the support plate for alignment with the wall opening, and a cable support extension or "nose shield" is mounted to the inner surface of the support plate for extending from the support plate and through the wall opening into the wall structure. The cable support extension has an internal sloped wall that is sloped with respect to the wall plate and that defines a cable passage oriented at an angle with respect to the support plate that is in registration with the access opening. The cable support extension extends into the wall structure so that an electrical cable can extend from within the wall structure, along the cable support extension and through the access opening and to the communications device, and the cable support extension forms a sight barrier from outside the wall structure through the access opening.

The support plate is flat and formed so as to be substantially coextensive with the wall to which it is to be mounted, such that substantially no protrusion extends from the outer surface of the support plate into the room. This enables objects such as a flat screen television to be mounted substantially flush with the vertical wall surface.

Preferably, the cable support extension or "nose" extends a distance between 2 and 3-½ inches from the support plate in a direction laterally from the support plate, for projecting into the wall structure. Since most wall structures are formed with wall board of less than one inch thickness that are mounted to vertical studs that are 3-¾ inches wide, the relatively large cable support extension of the wall plate can be accommodated by the typical wall structure.

Preferably, the cable support extension includes, in cross section, a U-shaped wall including opposed side wall segments mounted at the side edges of the support plate access opening and a distal wall segment mounted at one of the end edges of the support plate access opening and joined to the side wall segments and sloped away from the inner surface of the support plate. This U-shaped wall or "nose shield" defines open ends, with one open end in communication with the access opening of the support plate and the opposed inner open end extending into the interior of the wall structure.

The high voltage plug receptacle is mounted side-by-side with the nose of the wall plate. In one embodiment there is a plug receptacle housing supported on the inner surface of the support plate that opens through the support plate, and the plug receptacle is mounted to the outside surface of the back wall of the plug receptacle housing and is displaced from the support plate a distance sufficient to receive a plug within the plug receptacle housing.

When the wall plate is located in a position low in a wall structure, the inner opening of the sloped cable support extension may be installed so that the opening faces upwardly within the hollow wall so that the line of sight for the typical person standing or sitting in the room does not see the inner opening of the cable support extension. Likewise, if the wall plate is to be placed high on the wall, the wall plate can be inverted so that the inner opening of the sloped cable support extension faces downwardly inside the hollow wall so that a person standing or sitting in the room does not see the inner opening of the cable support extension. Thus, the cable support extension forms an interior sight barrier when the wall plate is exposed to view, but the wall plate does not have an extension that projects into the room. When the wall plate is to be placed behind a flat screen television or other wall mounted object, the cable support extension does not protrude outwardly of the support plate and, therefore, does not interfere with placement of the flat screen television, etc. on the wall.

Likewise the recessed plug receptacle is recessed in the wall plate so that it has enough space in front of it to allow the plug of the communications device to be received in the wall plate to avoid protruding from the wall plate.

Thus, it is an object of this invention to provide an improved wall plate for mounting about a wall opening of a wall structure for the passage of communication cable, with the wall plate being shaped and positioned so as to avoid interference with the mounting of objects directly to the wall at the position of the wall plate and to provide an interior sight barrier to avoid viewing through the opening in the wall.

Other objects, features and advantages of the present invention will become apparent upon reading the following specification, when taken in conjunction with the accompanying drawings.

DETAILED DESCRIPTION

Figure 1:
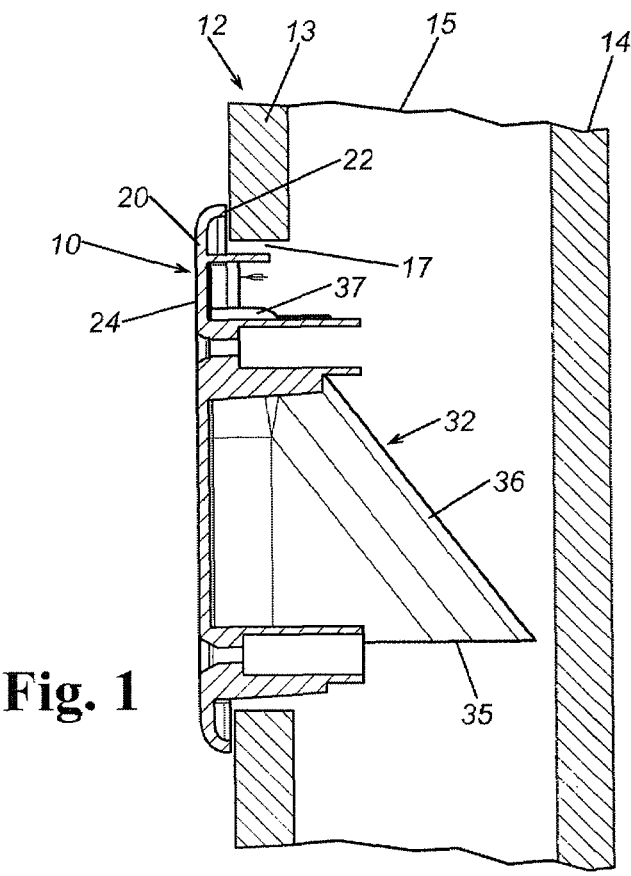
FIG. 1 is a side cross-sectional view of a hollow wall structure, showing how the wall plate is mounted in the hollow wall.

Referring now in more detail to the drawings, in which like numerals indicate like parts throughout the several views, FIG. 1 illustrates a wall plate 10 that has been positioned in a hollow wall 12 of a building structure. The wall includes a series of upright studs 15, usually 2×4s, with wall panels such as sheetrock panels 13 and 14 applied to the opposite faces of the frame work made of the upright studs.

When electrical wiring is to be installed in the building structure, it is common that the wiring pass through the hollow spaces between the studs 15 and the sheetrock panels 13 and 14 to accommodate wall plugs, light switches and, in recent years, communications cable for television sets, stereo systems, and home theaters. In some instances, the communications cable is formed in bundles of cables that extend to speaker systems throughout a room or throughout a building, such that the wires from the speakers must all be gathered back to the sound system. This may involve several communications cables in a bundle, with the bundle being of a larger diameter that requires additional space for leading to the source of the sound system. This may require a relatively large low voltage opening formed in the wall plate to accommodate the cables.

In addition, high voltage power such as 110 volts electrical power may be required to operate the communications system at the same position where the low voltage cables are gathered. To accommodate this, an opening 17 (FIG. 1) is formed in the wall panel 13 and the wall plate 10 is positioned in the opening. The wall plate 10 includes a support plate 20 that has an inner surface 22 for mounting against the wall and about the wall opening 17, and an opposed outer surface 24.

Figure 2:
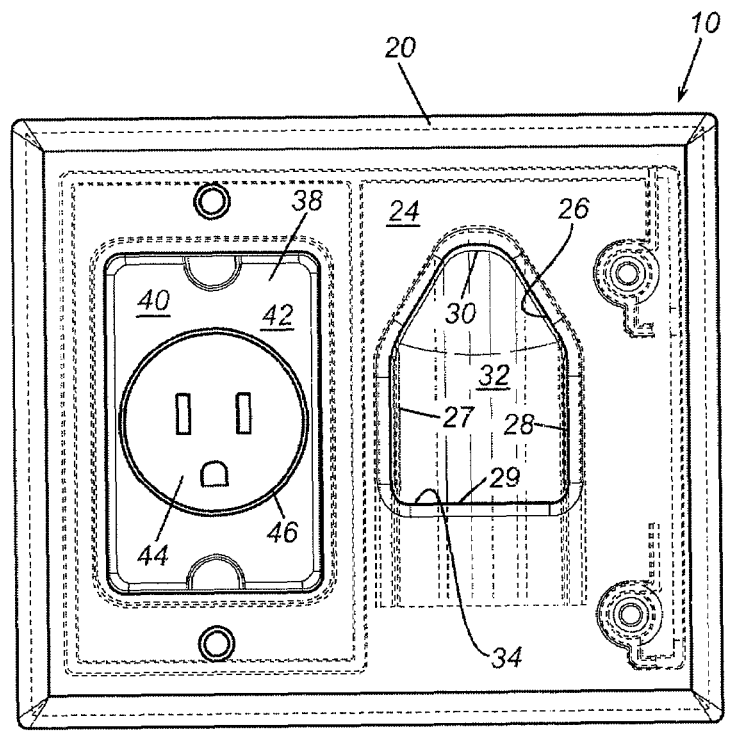
FIG. 2 is a front view of the wall plate, showing the electrical plug receptacle mounted in the plug receptacle housing.

As shown in FIG. 2, the support plate 20 defines support plate opening 26 that includes opposed side edges 27 and 28 and opposed end edges 29 and 30. The end edge 30 is of rounded V shape while the other edges are generally rectilinear and form rounded corners.

As shown in FIG. 1, cable support extension 32 is mounted to the inner surface 22 of the support plate for extending from the support plate opening and through the wall opening 17 of the wall panel and into the hollow structure of the wall 12. The cable support extension 32 is open-ended, having one open end 34 at the support plate 20 (FIG. 2) in direct communication with support plate opening 26 and the inner open end 35 (FIG. 1) extending at a right angle with respect to the open end 34.

The cable support extension is approximately U-shaped in cross section and its inner surface 36 within the hollow wall 12 is sloped away from the support plate 20 at an angle between about 55° and 60°. Cable support extension 32 also includes a hump 37 between the rear sloped surface 36 and the support plate 20 where the cable support extension is joined to the inner surface 22 of the support plate 20 (FIG. 1). This allows the sloped surface of the cable support extension to be displaced rearwardly of the support plate 20 and provides additional space in the cable support extension, providing more room for cable bundles such as the cable bundle 39 of FIG. 5.

Figure 4:
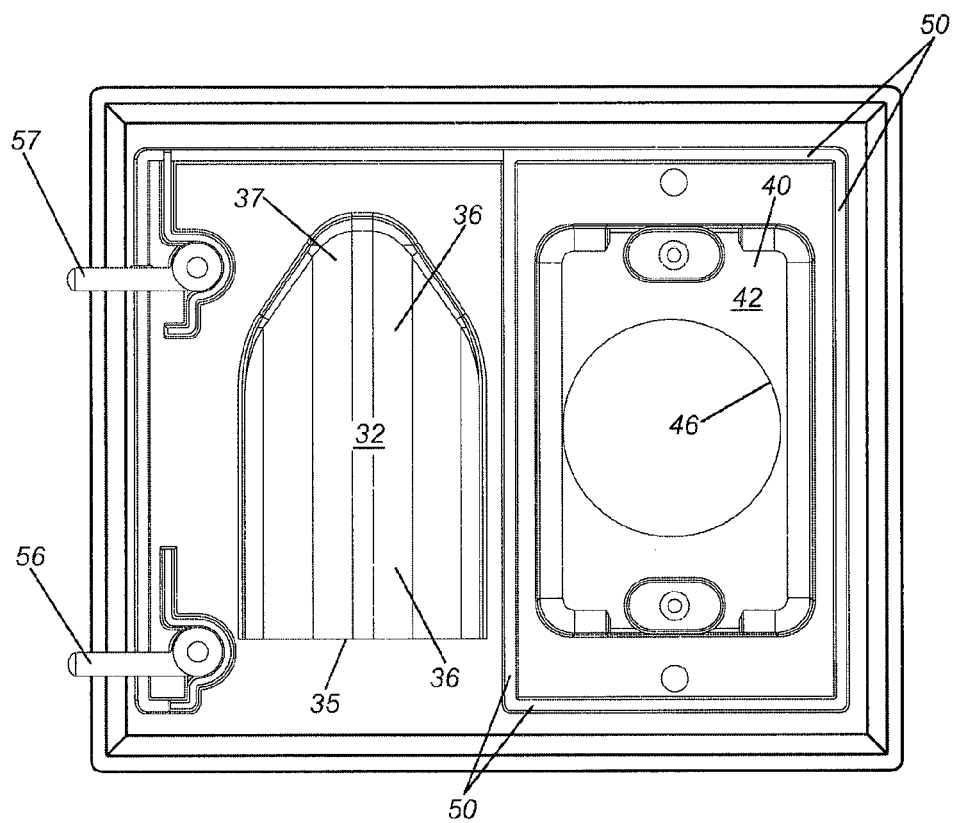
FIG. 4 is a rear view of the wall plate.

FIG. 2 shows the front face of the wall plate, while FIG. 4 shows the rear of the wall plate. It will be noted that the edge 29 of the support plate opening 26 is raised with respect to the inner open end 35 of the cable support extension 32. This offset relationship assures that the likelihood of a person seeing through the support plate opening and through the cable support extension is remote.

As shown in FIG. 1, when the wall plate 10 is mounted in an opening 17 in a panel 14 of the hollow wall structure 12, the cable support extension 32 extends deeply into the hollow portion of the hollow wall, approaching contact with the opposite wall panel 13. This provides the maximum depth opening of the inner open end 35, making it available to receive a bundle of communications cable having substantial breadth.

Figure 5:
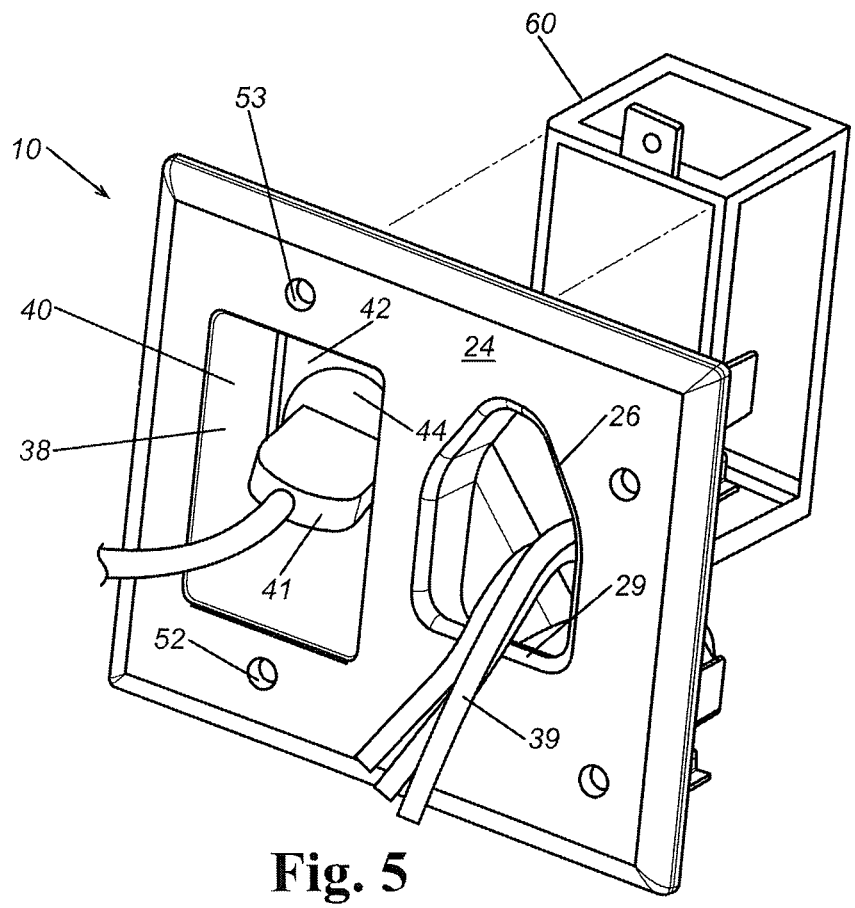
FIG. 5 is a perspective view of the wall plate, showing the front face of the wall plate, and showing the single gang mounting box displaced rearwardly of the wall plate.

As shown in FIGS. 2 and 5, the other half of the support plate 20 defines a plug opening 38. The inner surface 22 of the support plate 20 supports a plug receptacle housing 40 (FIG. 6) which supports a plug receptacle 44 (FIG. 2). The plug receptacle housing 40 is box-shaped having opposed side walls and opposed end walls, with a back wall 42. The open side of the plug receptacle housing is mounted to support plate 20 about the plug opening 38. The back wall 42 of the plug receptacle housing 40 is displaced inwardly of the support plate, leaving a space in the plug receptacle housing for receiving an electrical plug 41, described later herein. A round opening 46 is formed in the back wall 42.

Figure 3:
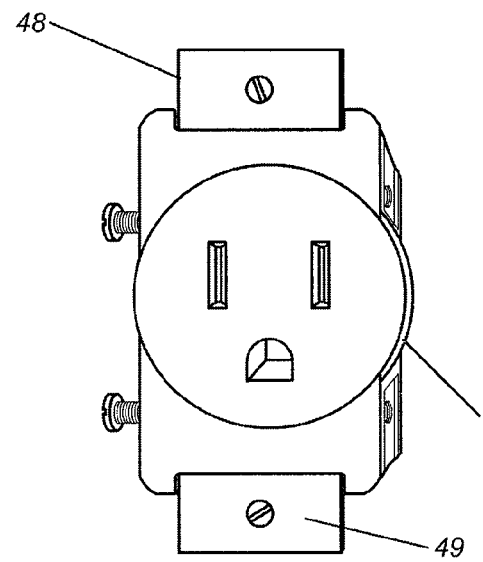
FIG. 3 is a front view of a plug receptacle.

As shown in FIG. 2, the plug receptacle 44 of FIG. 3 is mounted to the back side of the back wall 42. The plug receptacle has a round face that registers with the round opening 46 that is formed in the back wall of the plug receptacle housing. Connector tabs 48 and 49 extend from the plug receptacle that have openings therethrough that receive screws for connecting the connector tabs 48 and 49 to the back wall 42 of the plug receptacle housing 40. This mounts the rounded face of the plug receptacle 44 inside the round opening 46 of the plug receptacle housing 40. Also, this mounts the rounded face of the plug receptacle at a recessed position from the support plate within the plug receptacle housing. An electrical plug 41 that might lead from a sound system, television, etc. may be plugged in the plug receptacle and the plug will be recessed within the plug receptacle housing 40, extending inside the outer surface 24 of the support plate, so that the plug 41 will not obstruct any communications equipment that is mounted flush against the wall plate 10.

Figure 6:
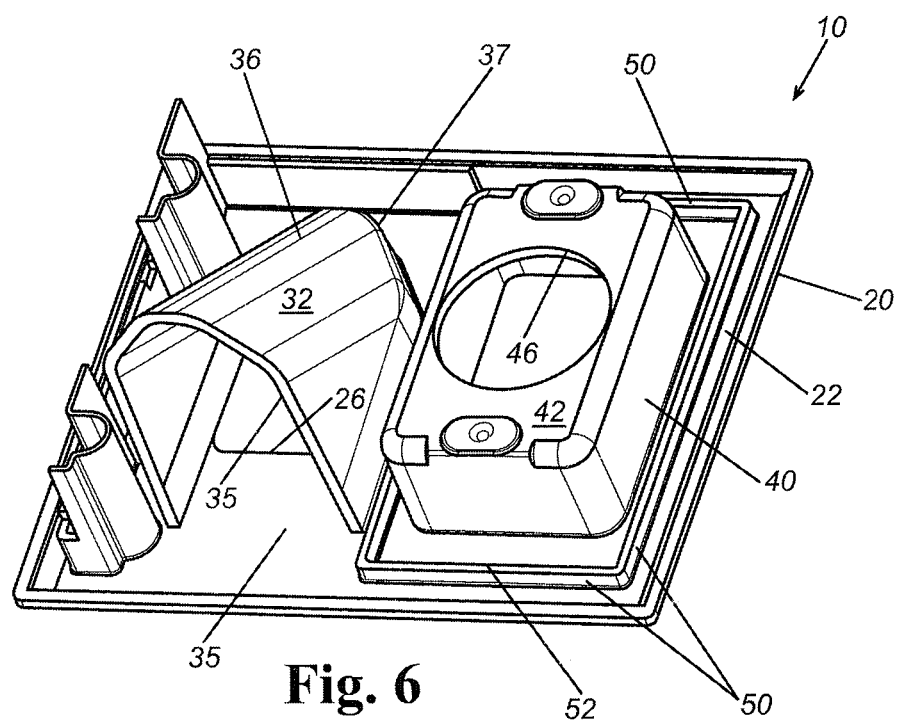
FIG. 6 is a rear perspective view of the wall plate.

It will be noted from FIGS. 4 and 6 that a mounting flange 50 is formed on the inner surface 22 of support plate 20 that surrounds the plug receptacle housing 40. This flange is sized, shaped and positioned to register with a single gang support box 60 (FIG. 5) that is of standard design and is mounted inside the opening formed in the wall panel where the wall plate 10 is to be mounted. Screw openings 52 and 53 that are formed through the support plate 20 receive connector screws that connect half of the support plate at the plug receptacle housing 40 to the single gang mounting box 60.

It will be noted that the portions of the support plate 20 are larger than the typical double gang support box commonly available for mounting double fixtures. Because of the larger breadth of the wall plate, the single gang mounting box 60 is used to mount the wall plate, with the plug receptacle housing being received in the single gang mounting box. In order to properly mount the other half of the wall plate that includes the cable support extension 32, lock wings 56 and 57 (FIG. 4) are pivotably mounted to the inner surface 22 of the support plate at the corners of the support plate. The lock wings are pivotal between positions parallel to the side edge of the support plate and to an extended position laterally of the support plate so as to engage through the opening 17 in the wall panel, to position themselves behind the wall panel. This prohibits the support plate from moving out of the opening of the wall panel.

The procedure for mounting the wall plate 10 in the wall structure is to mount the single gang mounting box 60 to the single wide opening in the wall panel and extend the opening in the wall panel for receiving the wall plate. Once the single gang support box 60 has been mounted, a template (not shown) is provided to the installer that aligns one side of the template opening with the single gang mounting box, with the other side of the opening of the template extending the proper distance laterally, showing the position and shape of the opening that must be cut into the wall panel. The installer forms the cutout, and this forms the hole of the right size and shape for receiving the wall plate 10.

The wall plate 10 as described herein is suitable for mounting communications products flat against the wall, such as a flat screen television. The wall plate provides passage for low voltage communication cable and provides high voltage power to the site of the communications device. The wall plate design is likely to be desirable for connections of other communications equipment since it provides a power and substantially flat surface on the wall panel, with no protrusions extending into the room.

The wall plate may be formed in different sizes and shapes as may be desired, and the cable support extension 32 and it support plate opening 26 may be formed with larger or smaller breadths to accommodate larger or smaller bundles of cable. The side portion that bears the cable support extension 32 may be wider or smaller since this portion of the wall plate does not require a support box. For example, the wall plate 10 may be about 2½ times as wide as a common single gang wall plate. As previously stated, a single gang support box may be used to support the side of the support plate at the plug receptacle housing and a template may be used for extending the wall hole to accommodate virtually any size side opening for the nose shield since the nose shield side of the wall plate has lock wings to connect to the wall board.

Although preferred embodiments of the invention have been disclosed in detail herein, it will be obvious to those skilled in the art that variations and modifications of the disclosed embodiments can be made without departing from the spirit and scope of the invention as set forth in the following claims.

We claim:

1. A wall plate for mounting about a wall opening of a wall in a hollow wall structure for passing of communications cable from inside the hollow wall structure through the wall opening to outside the hollow wall structure and for mounting a high voltage plug at the opening of the wall, the wall plate comprising: a support plate having an inner surface for mounting against the wall and about the wall opening, and an opposed outer surface, a support plate opening formed in the support plate for alignment with the wall opening, a cable support extension mounted to the inner surface of the support plate for extending from the support plate opening and through the wall opening and into the wall structure, the cable support extension forming a U-shape that extends from the inner surface of the support plate about and partially surrounds the support plate opening and defines a cable passage with respect to the support plate, a plug receptacle including plug openings facing the support plate and spaced from the inner surface of the support plate to receive an electrical plug between the support plate and the plug receptacle, such that the cable support extension extends through and beyond the wall opening and into the hollow wall structure so that an electrical cable can extend from within the hollow wall structure through the cable support extension and through the support plate opening, and the cable support extension forms an interior sight barrier from outside the wall structure through the wall opening, and the plug receptacle is positioned to receive an electrical plug through the support plate at a position inwardly from the outer surface of the support plate.

2. The wall plate of claim 1, wherein the support plate has an outer surface that is flat and formed to be substantially co-extensive with the wall to which it is to be mounted such that no protrusion extends from the outer surface of the support plate that would obstruct the mounting of a communications device in abutment with the wall plate.

3. The wall plate of claim 1, wherein the cable opening is oriented substantially perpendicular to the support plate.

4. The wall plate of claim 1, wherein the cable passage of the cable support extension has the breadth that is greater than the breadth of the opening of the support plate opening.

5. The wall plate of claim 1, wherein the cable support extension has an inner end for extending into the wall structure that forms an opening of the cable passage, and the inner end of the cable support extension extends between two inches and three and one half inches in a direction laterally from the support plate.

6. The wall plate of claim 1, wherein the cable support extension includes:
a substantially U-shaped wall including opposed side wall segments mounted at the side edges of the support plate opening and a distal wall segment mounted at one of the end edges of the support plate opening and joined to the side wall segments and sloped away from the inner surface of the support plate,
the U-shaped wall defining a cable opening at the other end edge of the support plate opening and a cable passage from the cable opening to the support plate opening and through the wall plate.

7. The wall plate of claim 1, and further including a plug receptacle housing supported on the inner surface of the wall plate and opening through the wall plate, and the plug receptacle positioned in the plug receptacle housing and displaced from the wall plate a distance sufficient to receive a plug within the plug receptacle housing.

8. A wall plate for mounting about a wall opening in a hollow wall structure for passing an electrical cable from inside the wall structure through the wall opening to outside the wall structure comprising: a support plate having an inner surface for mounting against the wall and about the opening in the wall, a support plate opening formed in the support plate for alignment with the wall opening, a cable support extension mounted to the inner surface of the support plate and forming a cable passage for extending from the support plate and through the wall opening and projecting into the wall structure and beyond the wall opening, the cable support extension configured for forming an interior sight barrier from outside the wall structure through the wall opening, a plug opening formed in the support plate for alignment with the wall opening, a plug receptacle housing mounted to the inner surface of the support plate and about the plug opening for extending from the plug opening and through the wall opening, and a plug receptacle supported by the plug receptacle housing with the plug receptacle positioned in spaced relationship with the inner surface of the support plate at a distance to receive an electrical plug through the plug opening without the plug protruding beyond the support plate.

9. The wall plate of claim 8, wherein the cable support extension is U-shaped in cross section and is sloped with respect to the support plate and defines a cable entrance opening that is substantially perpendicular to the support plate.

10. The wall plate of claim 8, and wherein the plug receptacle is positioned in the plug receptacle housing at a position recessed from the support plate for receiving a plug entirely within the plug receptacle housing.

11. The wall plate of claim 8, wherein the cable passage forms an entrance opening for receiving cable, wherein a breadth of the support plate opening is smaller than a breadth of the entrance opening of the cable passage.

12. The wall plate of claim 8, wherein the cable support extension extends along the support plate beyond the support plate opening.

13. The wall plate of claim 8, wherein the cable support extension has an inner end for extending into the wall structure that forms an inner opening of the cable passage, and the inner end of the cable support extension extends between two inches and three and one half inches in a direction laterally from the support plate and is sloped with respect to the support plate between 35 degrees and 45 degrees.

14. The wall plate of claim 8, and further including a registration flange extending from the inner surface of the support plate about the plug receptacle housing for registering with a support box mounted to the wall, and locking tabs positioned adjacent the cable support extension for engaging behind the wall and holding the support plate against the wall.

15. A wall plate for mounting about a hollow wall structure opening of a wall in a wall structure comprising: a support plate having an inner surface for mounting against the wall and about the opening in the wall, a support plate opening formed in the support plate for alignment with the wall opening, a cable support extension mounted to the support plate and forming a cable passage from the support plate opening and sized and shaped to project away from the support plate into the wall structure and beyond the wall opening of the wall structure, the cable support extension configured for forming an interior sight barrier from outside the wall structure through the wall opening, a plug opening formed in the support plate for alignment with the wall opening, a plug receptacle housing mounted to the inner surface of the support plate and about the plug opening for extending from the plug opening and through the wall opening, and a plug receptacle supported by the plug receptacle housing and spaced from the support plate a distance to receive an electrical plug in the plug receptacle housing.

16. The wall plate of claim 15, and further including a registration flange extending from the inner surface of the support plate about the plug receptacle housing for registering with a support box mounted to the wall, and locking tabs positioned adjacent the cable support extension for engaging behind the wall and holding the support plate against the wall.

17. A wall plate for mounting to a hollow wall structure and about an opening in the wall structure comprising: a support plate having an inner surface for mounting against the wall and about the opening in the wall, a support plate opening formed in the support plate for alignment with the wall opening and forming a cable passage, an open ended cable support extension extending from the inner surface of the support plate in registration with the support plate opening of a length to project beyond the wall opening and into the wall structure, a plug opening formed in the support plate for alignment with the wall opening, a plug receptacle mounted in alignment with the plug opening, and the plug receptacle spaced from the inner surface of the support plate and forming with the support plate a recess for receiving an electrical plug through the plug opening of the support plate into the plug receptacle.

18. The wall plate of claim 17, wherein the open ended cable support is tubular, and is sloped with respect to the support plate, and includes a hump adjacent the support plate that displaces the sloped potion of the open ended cable support from the support plate.

* * * * *